March 25, 1952     J. E. WATKINS     2,590,741
LIQUID RETURN TRAP IN REFRIGERATING SYSTEMS
Filed Jan. 24, 1949     2 SHEETS—SHEET 1
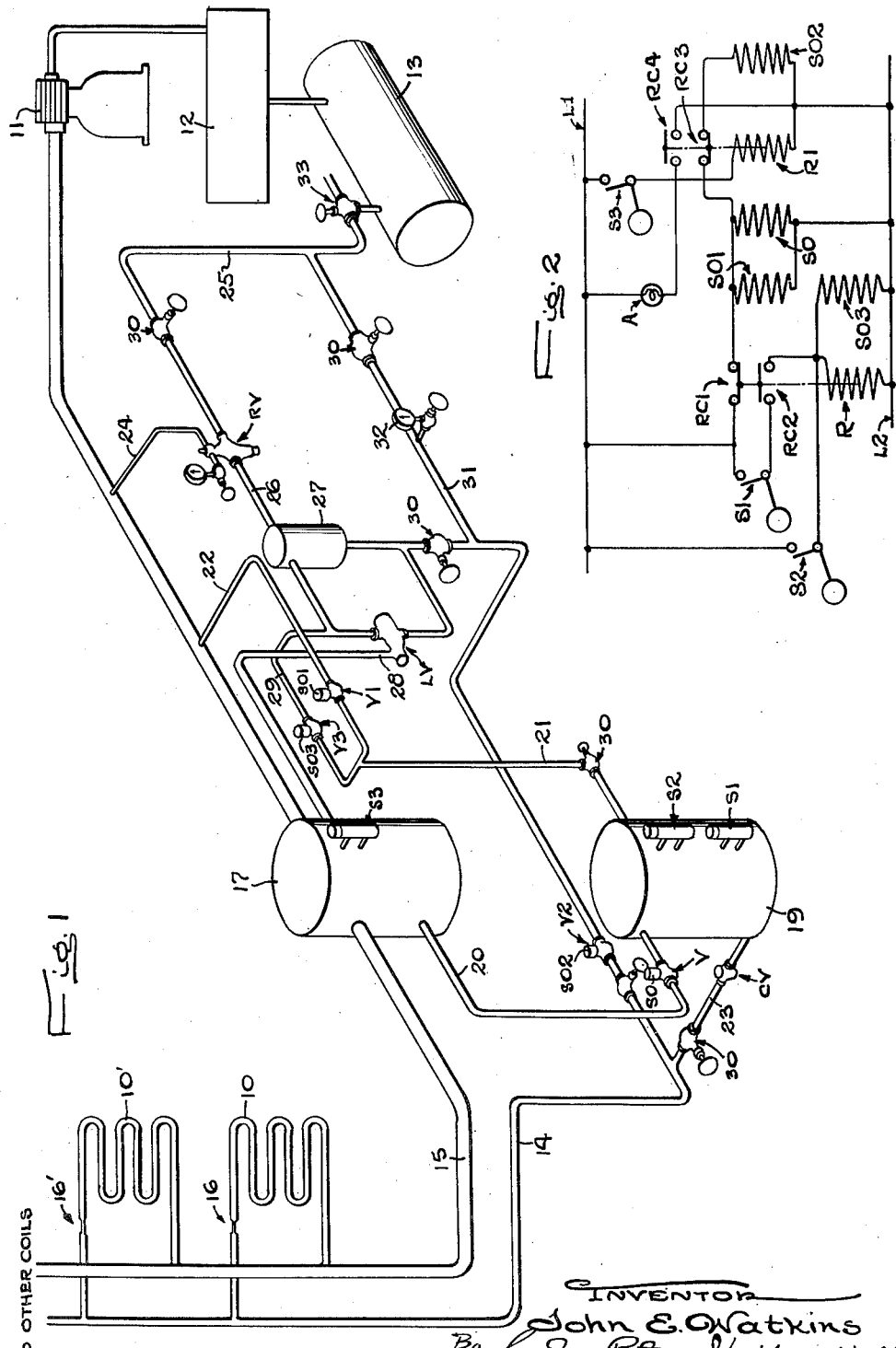

March 25, 1952        J. E. WATKINS        2,590,741
LIQUID RETURN TRAP IN REFRIGERATING SYSTEMS
Filed Jan. 24, 1949        2 SHEETS—SHEET 2
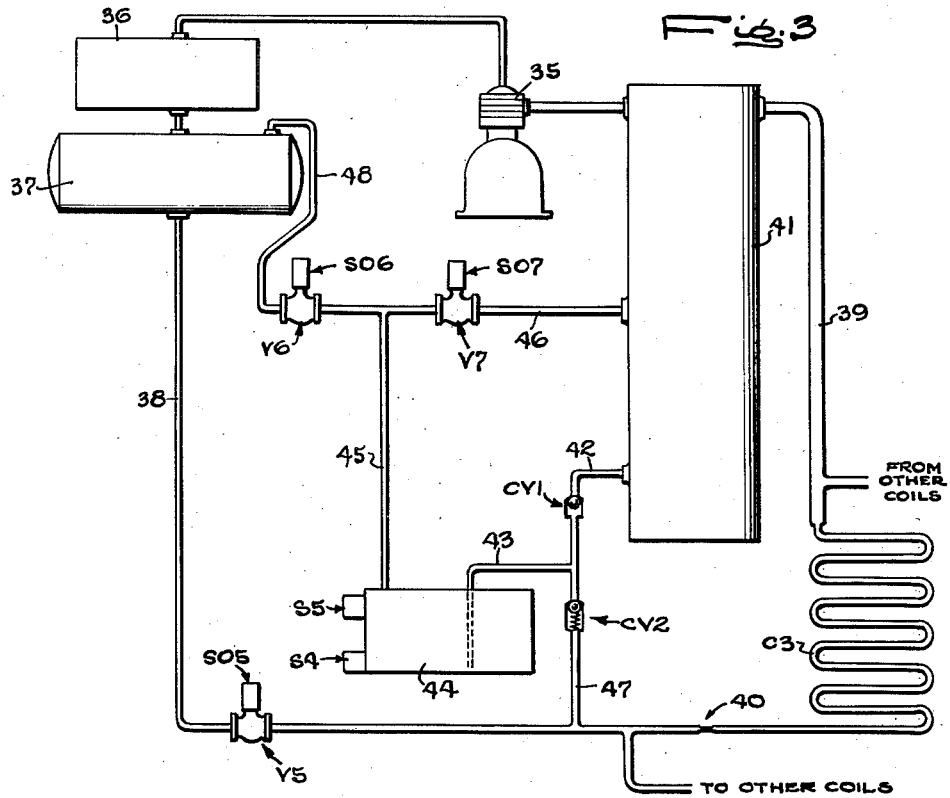
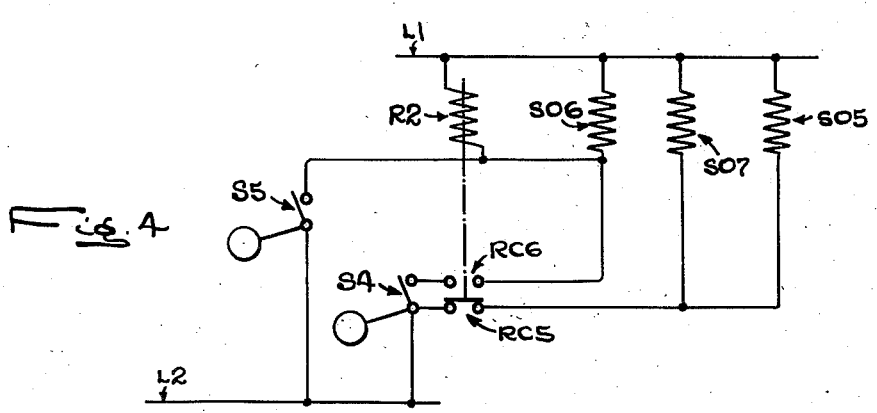
INVENTOR
John E. Watkins
ATTORNEY Patented Mar. 25, 1952

2,590,741

UNITED STATES PATENT OFFICE 2,590,741

LIQUID RETURN TRAP IN REFRIGERATING SYSTEMS

John E. Watkins, Maywood, Ill.

Application January 24, 1949, Serial No. 72,316

11 Claims. (Cl. 62—3)

The invention relates to refrigerating systems, particularly of the large capacity type used in commercial installations, and its primary object is to provide an improved system which is simpler in construction, easier and cheaper to maintain and more efficient in operation than the systems heretofore available.

In systems of the above general character, the necessity for protecting the compressor from what is commonly referred to as "slop over" of liquid from the evaporator requires the restriction of the liquid refrigerant supply to a definite and relatively low value. In some instances, the supply of refrigerant is limited to the amount that can be completely vaporized in the evaporator. This, of course, entails the use of control instrumentalities capable of accurately regulating the supply rate according to the varying requirements of the evaporator. Such controls are complicated and expensive, and moreover require almost constant attention to insure proper operation. Even with the best controls available, the efficiency of the system when operated in the above manner is relatively low because the full capacity of the evaporator cannot be used.

Somewhat greater efficiency has been attained by adjusting the controls so as to supply a slight excess of liquid refrigerant to the evaporator and by providing surge tanks or accumulators in the low or suction side of the system for trapping the liquid refrigerant passing through the evaporator. With this arrangement, the same complicated control instrumentalities are required and the additional problem of disposing of the trapped liquid is presented. Various expedients have been proposed for the solution of this problem, such as boiling off the liquid with heat supplied from another part of the system. Such an arrangement entails the installation of additional apparatus and controls, with a corresponding increase in both initial and maintenance costs.

It has also been proposed to utilize a pump or ejector for returning the trapped liquid to the refrigerant circulating system. Apparatus of that type is expensive to install and maintain, and moreover requires the expenditure of additional power.

The present invention aims to overcome the difficulties and eliminate the objectionable features above discussed and to provide for the continuous operation of the evaporators in a flooded condition with complete safety and with a substantial increase in operating efficiency.

A more specific object is to provide improved means for trapping the liquid refrigerant passing through a flooded evaporator and for returning the liquid to the system in an efficient and reliable manner and without requiring the intervention of an attendant.

Another object is to provide a refrigerating system utilizing simple, fixed orifices for controlling the delivery of the liquid refrigerant to the evaporators, thereby eliminating the complicated and expensive thermal expansion valves and other troublesome controls heretofore required.

Another object is to provide a refrigerating system adapted to operate with a minimum pressure differential between the high and low sides of the system and in which the liquid line pressure may be maintained constant at all times, regardless of the condensing pressure.

Still another object is to provide for the recirculation of liquid refrigerant trapped in an accumulator which utilizes energy in the refrigerating cycle that is normally wasted.

A further object is to provide a refrigerating system in which substantially all of the auxiliary equipment, such as the accumulator, flash tank and controls, may be located at a central point, as, for example, in the compressor room, instead of being closely associated with the individual evaporators as has heretofore been necessary whereby the servicing and supervision of such equipment is greatly facilitated.

Other objects and advantages of the invention will become apparent from the following detailed description of the preferred embodiments illustrated in the accompanying drawings, in which:

Figure 1 is a diagrammatic view of a refrigerating system embodying the features of the invention.

Fig. 2 is a diagram of the electrical control circuit provided in the system shown in Fig. 1.

Fig. 3 is a diagrammatic view of a modified form of refrigerating system.

Fig. 4 is a diagram of the electrical control circuit provided in the system shown in Fig. 3.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration the invention has been shown as embodied in a refrigerating system in which a liquid refrigerant, such as ammonia, is supplied from a common source to a plurality of evaporators in the form of cooling coils 10 and 10'. The cooling coils, of which there may be more than the two shown, may be located in different rooms of a cold storage plant or in different cooling units of the installation, in accordance with conventional practice.

The source of liquid refrigerant may be of any preferred type as herein shown comprises a compressor 11, a condenser 12 into which the compressor discharges, and a receiver 13 for storing the liquid refrigerant produced in the condenser. The foregoing elements may all be of conventional construction. Liquid refrigerant from the receiver 13 is supplied by way of a feed line 14 to the cooling coils 10, 10', each of which has its inlet end connected with the feed line and the outlet end connected by a common suction line 15 with the suction side of the compressor 11.

In order to enable the system to operate at maximum efficiency, provision is made for supplying liquid refrigerant to the coils 10, 10' in an amount substantially greater than the coils are capable of evaporating, for trapping the excess liquid passing through the coils, and for automatically returning the trapped liquid to the coils. As it is only necessary in this case to insure flooding of the cooling coils, control of liquid flow therethrough may be effected by simple orifice means 16, 16' interposed between the respective coils and the feed line 14.

In the system shown in Fig. 1 of the drawings, excess liquid passing through the cooling coils is trapped in a surge tank or accumulator 17 connected in the suction line 15. To recirculate or return the excess liquid refrigerant to the system, provision is made for draining the trapped liquid from the accumulator 17 into a reservoir or auxiliary accumulator 19 which can be closed off from the main accumulator when required and subjected to sufficient pressure to force the liquid out into the feed line 14 and through the coils 10, 10'.

Referring more specifically to Fig. 1 of the drawings, the auxiliary accumulator 19, herein shown as comprising a cylindrical sheet metal tank, is connected with the main accumulator 17 by a conduit 20 which opens into the latter adjacent its lower end. A valve V is interposed in the conduit for closing it when the auxiliary accumulator is to be emptied, as will be described hereinafter. The valve V shown is of the open and closed type, but if sufficient head of liquid is available a check valve may be used instead to permit drainage of the liquid from the main accumulator to the auxiliary accumulator while preventing reverse flow through the conduit 20.

A vent conduit 21 opening from the upper end of the auxiliary accumulator 19 and having a branch 22 connecting with the suction line 15 serves to equalize the pressure in the two accumulators and thus permit gravity flow of liquid through the conduit 20. A valve V1 in the branch 22 controls this vent connection.

For expelling the collected liquid, the auxiliary accumulator 19 is connected by a conduit 23 with the feed line 14. During the discharge of liquid the feed line is closed off from the source of liquid refrigerant by a valve V2 interposed in the line between its junction in the conduit 23 and the liquid refrigerant source. A check valve CV is interposed in the conduit 23 to prevent flow of refrigerant from the feed line into the auxiliary accumulator while permitting flow to the line.

In the particular system illustrated in Fig. 1 of the drawings, the energy for expelling collected liquid from the auxiliary accumulator 19 is derived from a preliminary expansion of the refrigerant whereby its pressure is reduced and the flash gas removed prior to the introduction of the refrigerant into the cooling coils. Operation of the coils at pressures substantially lower than the pressure at which the condenser 12 is ordinarily operated is made possible by the manner in which the coils are supplied with refrigerant, that is, by their operation in a flooded condition and with a substantially constant flow of liquid refrigerant therethrough. Moreover, since the flash gas pressure may be regulated independently of the condenser pressure, a pressure much lower than the condenser pressure may be maintained in the feed line at all times. Condenser pressure may therefore be reduced, permitted by the condensing medium, resulting in a substantial saving in operating costs. The preliminary pressure reduction also serves to increase the efficiency of the system by precooling the liquid before introduction into the cooling coils and by removing the flash gas ahead of the coils.

Pressure reduction is effected in the present instance by a pressure reducing valve RV of conventional construction having a control connection 24 with the suction line 15 whereby a constant pressure differential is maintained between the feed line 14 and the suction line. This differential pressure may be adjusted so that it is just sufficient to supply the necessary quantity of liquid refrigerant to the cooling coils and consequently no power is wasted through the use of unnecessarily high pressures.

The valve RV in this instance is connected in an outlet conduit 25 leading from the receiver 13 and the valve discharges through a conduit 26 into a flash tank 27 which serves to separate flash gas from the liquid refrigerant. The flash tank is connected so as to supply liquid refrigerant to the feed line 14. It will be appreciated of course that the temperature of the liquid refrigerant is substantially reduced by reason of its passage through the valve RV and consequently the refrigerant as supplied to the coils is at substantially lower temperature than the refrigerant leaving the receiver 13.

Associated with the flash tank 27 is a level responsive control valve LV which may be of the float or other suitable type adapted to maintain a constant liquid level in the tank. When the level falls the valve opens to vent the flash gas from the tank through a conduit 28 to the suction side of the system. Pressure in the tank is thus reduced causing valve RV to admit more liquid refrigerant to the tank. A conduit 29 branching from the conduit 21 opens into the upper end of the flash tank 27 for diverting flash gas from the tank into the auxiliary accumulator 19 to expel the collected liquid therefrom. The flow of flash gas through this conduit is controlled by a valve V3.

In the normal operation of the system, valves V, V1 and V2 are open and valve V3 is closed. Liquid refrigerant accordingly flows from the receiver 13 through the conduit 25, pressure reducing valve RV, conduit 26, flash tank 27 and feed line 14 to the cooling coils 10, 10'. As the valve RV is adjusted to maintain sufficient pressure in the feed line 14 to flood all of the cooling coils, a substantial quantity of liquid coolant will pass into the suction line 15 while the system is operating normally. This excess liquid is trapped in the main accumulator 17 from which it flows by gravity to the auxiliary accumulator 19 by way of the conduit 20 and valve V.

To return the trapped liquid to the circulating system it is only necessary to close the valves V, V1 and V2 and to open valve V3. Opening of the latter valve directs flash gas from the tank 27 to the auxiliary accumulator and forces the liquid therefrom through the check valve CV and conduit 23 into the feed line 14 and thence through the coils 10, 10'. Closure of the valve V2 interrupts the normal flow of liquid refrigerant from the receiver, but the refrigerating action of the coils continues without interruption due to the supply of liquid received from the auxiliary accumulator. It will be observed that the energy for effecting the recirculation of the trapped liquid is derived from the refrigerating cycle without imposing any additional load on the system, but by merely utilizing energy that is ordinarily wasted in conventional refrigerating systems.

While the liquid recirculating cycle above described may be controlled manually if desired, the invention contemplates the use of automatic controls whereby recirculation may be effected without the intervention of an attendant and without supervision. For this purpose the control valves V, V1, V2 and V3 are equipped with power-operated actuators, in this instance in the form of solenoids SO, SO1, SO2 and SO3. As will be seen by reference to the circuit diagram in Fig. 2, solenoids SO, SO1 and SO2 are connected across conductors L1 and L2 on a suitable current supply line through normally closed switch contacts RC1 of a relay R. The solenoids are thus normally energized and maintain their associated valves V, V1 and V2 open so that the system may operate in the conventional manner.

To effect closure of the valves V, V1 and V2 and opening of the valve V3 at the proper times, the auxiliary accumulator 19 is provided with switches S1 and S2 actuated in response to changes in the liquid level therein. These switches, which may be of the float-operated type, are disposed at different levels with respect to the accumulator, the arrangement in this instance being such that switch S1 is open when the accumulator is empty and is closed upon initial introduction of liquid thereto. Switch S2 is arranged to close as the accumulator fills up to a maximum safe level and to open when the liquid falls below that level.

In the exemplary control circuit shown in Fig. 2, initial closure of the switch S1 is without effect. Closure of switch S2 as the accumulator becomes filled completes an energizing circuit for the relay R. The relay becomes energized and opens the switch contacts RC1 to interrupt the energizing circuit for the solenoids SO, SO1 and SO2. These solenoids become deenergized and allow their associated valves V, V1 and V2 to close. Solenoid SO3 is connected in parallel with the relay R and becomes energized simultaneously therewith to open the valve V3.

In addition to opening the switch contacts RC1, relay R also closes switch contacts RC2 to complete a holding circuit for itself and for the solenoid SO3 by way of the closed level switch S1. Accordingly, the various solenoids are maintained in the energized or deenergized condition above described while the liquid transfer from the auxiliary accumulator proceeds and until the accumulator is emptied. At that time, the switch S1 opens and allows the relay R to deenergize and the various solenoids to return to their normal operating condition.

Provision is made for automatically shutting down the system in the event of failure of the liquid transfer apparatus to function properly. For this purpose the main accumulator 17 is provided with a float switch S3 adapted to close when the liquid in the accumulator reaches a predetermined level. Closure of the switch S3 completes a circuit for the relay R1 (Fig. 2) which becomes energized and opens switch contacts RC3 to interrupt the circuit for the solenoid SO2. This solenoid accordingly deenergizes, allowing valve V2 to close and shut off the supply of liquid refrigerant from the feed line 14. Relay R1 also closes switch contacts RC4 to complete a circuit for a signal device A which may be arranged to give either an audible or a visual alarm, or both.

Hand valves 30 are provided at suitable points in the system so that a part of the liquid transfer apparatus may be temporarily cut out of service and the system operated under manual control in an emergency. Under such conditions fluid is supplied to the feed line 14 by way of a conduit 31 bypassing the pressure-reducing valve RV and the flash tank 27. The normally open solenoid operated valves remain open and the normally closed solenoid operated valves remain closed until reset either manually or by manual manipulation of their controlling switches. Pressure in the feed line, as indicated by a gauge 32, may be regulated by a hand valve 33.

In addition to the increased operating efficiency afforded by the improved refrigerating system, substantial savings in maintenance are effected by the elimination of the thermal expansion or other automatic feed valves ordinarily required for regulating the refrigerant supply to the cooling coils. Additional economies may be effected by locating the various valves, tanks and control instrumentalities at a central point, as, for example, in the compressor room where they are readily accessible for observation or repair. Such centralized assembly is readily effected in the improved system since the elements in question are common to all of the cooling coils, the orifice means 16 and 16' alone being associated with the coils individually.

In cases where it is desired to operate the cooling coils at full condensing pressure, the advantages and economy of flooded coil operation and automatic recirculation of excess liquid may be realized with the arrangement shown in Fig. 3 of the drawings. In the system there disclosed, a compressor 35 discharges into a condenser 36 and the liquid refrigerant produced therein is collected and stored in a receiver 37. The liquid refrigerant passes from the receiver through a feed line 38 to the cooling coils, of which one coil C3 has been shown. The outlet ends of the coils are connected with the suction side of the compressor by a common suction line 39.

As in the system previously described, the supply of liquid refrigerant to each coil is controlled by simple orifice means 40 dimensioned to insure delivery to the coils of liquid in excess of the amount which they are capable of evaporating. The excess liquid passing through the coils is trapped in a surge tank or accumulator 41 from which it drains by way of a branch 42 of a conduit 43 into a reservoir or auxiliary accumulator 44. A check valve CV1 in the branch conduit prevents reverse flow of liquid from the auxiliary accumulator to the main accumulator. To permit gravity flow of liquid, the auxiliary accumulator 44 is normally vented by a conduit 45 having a branch 46 opening into the main accumulator.

To provide for expelling collected liquid from the auxiliary accumulator, the conduit 43 is provided with a second branch 47 opening into the feed line 38. A check valve CV2 in the branch line 47 prevents flow of liquid from the feed line to the auxiliary accumulator.

In order to expel the collected liquid from the auxiliary accumulator, provision is made for closing the feed line from the receiver 37 and for introducing gaseous refrigerant under pressure into the auxiliary accumulator. The closing off of the feed line is effected by a valve V5. Pressure gas may be derived from any suitable source of the system, as through a branch 48 of the conduit 45, which may be connected with the receiver 37, as shown in full line in the drawing, or with the hot gas line from the compressor, as shown in broken lines. A valve V6 in the branch conduit 48 controls the flow of pressure gas and a similar valve V7 is provided in the branch conduit 46 for closing the vent line when the valve V6 is opened.

In the normal operation of the system, valves V5 and V7 are open and valve V6 is closed. Liquid refrigerant therefore passes from the receiver through the open valve V5, feed line 38 and orifice means 40 to the cooling coils. Spent refrigerant is drawn off through the suction line 39 and accumulator 41. The orifice means of course admits more liquid to the coils than the latter are capable of evaporating and the excess liquid is trapped in accumulator 41. This trapped liquid drains by gravity through the check valve CV1 and conduits 42 and 43 to the auxiliary accumulator, where it is stored temporarily.

To expel the collected liquid from the auxiliary accumulator, valve V5 is closed to interrupt the flow of refrigerant from the receiver 37 and valve V7 is closed to interrupt the venting of the accumulator. The opening of valve V6 admits gaseous refrigerant under compression to the auxiliary accumulator and the liquid collected therein is forced out through the conduits 43 and 47 and the check valve CV2 into the feed line 38 and thence through the cooling coils.

In order to control the recirculating cycle automatically, the auxiliary accumulator 44 is provided with level switches S4 and S5 similar in construction and mode of operation to the switches S1 and S2 heretofore described. Valves V5, V6 and V7 are equipped with solenoid operators SO5, SO6 and SO7, respectively. Solenoids SO5 and SO7 are energized through normally closed switch contacts RC5 of a relay R2. The level switch S4 closes without effect upon initial introduction of liquid into the auxiliary accumulator. Level switch S5 closes as the accumulator becomes full and completes an energizing circuit for relay R2. Energization of the relay opens the switch contacts RC5 and closes switch contacts RC6, the latter completing an energizing circuit for the solenoid SO6. The latter solenoid accordingly opens valve V6 and solenoids SO5 and SO7 become deenergized to permit their associated valves V5 and V7 to close, thereby establishing the recirculating circuit as above described.

As the collected liquid is forced from the auxiliary accumulator level, switch S5 opens but relay R2 and solenoid SO6 remain locked up through the closed level switch S4. The latter switch opens when the accumulator is emptied, thus interrupting the locking circuit and restoring all of the valves to their normal operating positions.

It will be apparent from the foregoing that the invention provides a refrigerating system of novel and advantageous construction. By reason of the novel means provided for trapping and recirculating excess liquid refrigerant, the cooling coils may be operated in a flooded condition and therefore with much greater efficiency than is possible in conventional refrigerating systems. The liquid recirculating means provided by the invention is very simple in construction and entirely automatic in operation, thus insuring proper functioning of the system with a minimum of supervision. Moreover, the improved mode of operation permits the use of simple orifices for controlling the supply of liquid refrigerant to the cooling coils and allows the system to be operated with a minimum pressure differential between the high and low sides thereof. Such operating pressure may be maintained constant at all times regardless of condensing pressures and the latter may be reduced with substantial savings in power consumption when the demands on the system decrease. Energy for effecting the recirculation of the excess liquid is obtained without any increase in the over-all power requirements of the system.

The various valves, accumulators and controls required in the improved system may all be of conventional construction and all are relatively simple and inexpensive. Moreover, since these elements are common to all of the evaporators or cooling coils, they may be assembled in a central position for convenience of supervision or repair.

I claim as my invention:

1. A refrigerating system comprising, in combination, a compressor, a condenser into which said compressor discharges, a receiver for storing liquid refrigerant produced in said condenser, a plurality of cooling coils, a feed line for conveying liquid refrigerant from said receiver to said coils, a suction line connected with the suction side of said compressor and with each of said coils, means associated with each coil for admitting liquid refrigerant thereto in an amount substantially in excess of the amount which the coil is capable of evaporating, a main accumulator in said suction line for trapping the excess liquid refrigerant passing through said coils, an auxiliary accumulator, connections between said accumulators for equalizing the pressures therein and for accommodating a gravity flow of trapped liquid from the main accumulator to the auxiliary accumulator, means for closing said connections between the accumulators and for increasing the pressure in said auxiliary accumulator to force the accumulated liquid therefrom, means for closing off said feed line from said receiver, and a connection between said auxiliary accumulator and said feed line for conducting liquid refrigerant from that accumulator to the feed line.

2. A refrigerating system having, in combination, means providing a source of liquid refrigerant under pressure, a cooling coil, means for admitting liquid refrigerant from said source to said coil in an amount in excess of the amount which the coil is capable of evaporating, a pressure reducing valve and a flash tank interposed between said source and said coil, means for venting the gaseous component of the refrigerant from said tank at a rate effective to maintain the liquid in the tank at a substantially constant level, a main accumulator positioned to trap the excess liquid passing through said coil, an auxiliary accumulator arranged to drain the trapped liquid from said main accumulator, said auxiliary accumulator having a connection with said coil, and connections for directing a flow of flash gas from said tank into said auxiliary accumulator to force the accumulated liquid therefrom into said coil.

3. A refrigerating system having, in combination, a compressor, a condenser into which said compressor discharges, a receiver for storing the refrigerant liquefied in said condenser, a feed line receiving liquid from said receiver, a suction line connected with the suction side of said compressor, a plurality of cooling coils connected across said lines, means associated with each coil defining an orifice dimensioned to admit liquid thereto in an amount substantially in excess of the amount which the coil is capable of evaporating, means for adjusting the pressure of the liquid in said feed line to insure flooding of each of said coils, an accumulator interposed in said suction line for trapping the excess liquid passing through said coils, and means including a reservoir connected to receive liquid trapped in said accumulator and having valved connections with the coils and with the pressure side of the system operable automatically upon the accumulation of a predetermined quantity of trapped liquid for shutting off said reservoir from said accumulator and for returning the received liquid from the reservoir to said coils at the pressure normally maintained in the feed line by said said adjusting means, said feed line being temporarily shut off from said receiver during such return.

4. A refrigerating system comprising, in combination, a feed line, a condenser and compressor supplying liquid refrigerant to said feed line, a valve for expanding the liquid refrigerant in said line to a pressure substantially below that of the pressure at said condenser, a plurality of cooling coils connected to said feed line, means associated with each of said coils for admitting thereto an amount of liquid coolant greater than the coil is capable of evaporating, a common suction line connecting said coils to the suction side of said compressor, an accumulator in said suction line for trapping the unevaporated liquid passing through the coils, a reservoir having a valved connection with said accumulator for the transfer of trapped liquid to the reservoir, said reservoir also having a valved connection with said coils, and liquid transfer means for introducing into said reservoir gas generated by the passage of the refrigerant through said expansion valve for returning the trapped liquid to the feed line by way of said last mentioned connection.

5. In a refrigerating system, in combination, a source of liquid refrigerant, a cooling coil, means for supplying liquid from said source to said coil in an amount greater than the coil is capable of evaporating, means for trapping the liquid passing through the coil, a reservoir for receiving and temporarily storing the trapped liquid, said reservoir having a connection with said coil, valve means operable to close off said source of liquid refrigerant from said coil, other valve means operable to introduce vaporized refrigerant from the pressure side of the system into said reservoir to force the liquid therefrom and through said coil, and control means for initiating the operation of both valve means.

6. In a refrigerating system, in combination, a cooling coil, a feed line for supplying liquid refrigerant under pressure to said coil in an amount greater than the coil is capable of evaporating, a suction line for drawing off the vaporized and liquid refrigerant from said coil, an accumulator in said suction line for trapping the liquid passing through the coil, a reservoir for receiving and temporarily storing the liquid trapped in said accumulator, conduit means connecting said reservoir with said coil, means operable in response to changes in the level of the liquid in said reservoir, and valve means controlled by said level responsive means for introducing vaporized refrigerant from the pressure side of the system into said reservoir to force the liquid therefrom through said coil by way of said conduit means.

7. In a refrigerating system, in combination, a cooling coil, a feed line for supplying liquid refrigerant under pressure to said coil in an amount greater than the coil is capable of evaporating, a suction line for drawing off the vaporized and liquid refrigerant from said coil, an accumulator in said suction line for trapping the liquid passing through the coil, a reservoir connected with said accumulator for receiving the liquid trapped in the accumulator and for temporarily storing such liquid, said reservoir having a connection with said feed line, and mechanism operable intermittently for interrupting the normal flow of liquid through said feed line, for interrupting the connection between said accumulator and said reservoir and for introducing vaporized refrigerant from the pressure side of the system into said reservoir to force the stored liquid into the feed line and through said coil.

8. In a refrigerating system, in combination, a cooling coil, a feed line with a flow control device therein for supplying liquid refrigerant under pressure to said coil in an amount greater than the coil is capable of evaporating, a suction line for drawing off the spent refrigerant from said coil, an accumulator in said suction line for trapping the liquid passing through said coil, normally open valve means for controlling the flow of liquid through said feed line, a reservoir connected with said accumulator for receiving the liquid trapped therein, normally open valve means for controlling said connection, a conduit connected in the refrigerating system to receive vaporized refrigerant and to introduce such refrigerant under pressure into said reservoir for expelling the collected liquid therefrom, conduit means including a normally closed valve connecting said reservoir with said feed line, and switch means operable upon the filling of said reservoir to a predetermined level for initiating the closing of said normally open valve means and the opening of said normally closed valve means, said valve means returning to their normal conditions upon a predetermined drop of the liquid level in said reservoir.

9. In a refrigerating system, a source of liquid refrigerant under compression, a plurality of cooling coils, a feed line and a suction line connecting said coils with said source, orifice means associated with each coil for admitting thereto liquid in excess of the amount that the coil is capable of evaporating, an accumulator in said suction line for trapping the liquid refrigerant passing through said coils, a reservoir for receiving and temporarily storing the trapped liquid, transfer means operable upon the accumulation of a predetermined amount of trapped liquid in said reservoir for returning such liquid to said feed line including means for supplying vaporized refrigerant from the pressure side of the system to said reservoir to supply the energy for effecting the return of the liquid, and valve means operable to interrupt the supply of liquid through said feed line from said source during such return of trapped liquid.

10. A refrigerating system having, in combination, a source of liquid refrigerant under pressure, a cooling coil, feed and suction lines connecting said source with opposite ends of said coil, means interposed between said coil and said feed line for admitting liquid refrigerant to the coil in an amount substantially in excess of the amount which the coil is capable of evaporating, a flash tank interposed in said feed line, an accumulator interposed in said suction line for trapping the excess liquid passing through said coil, a reservoir connected with said accumulator for receiving and temporarily storing the trapped liquid, a normally open valve in said feed line between said flash tank and said coil operable to cut off the coil from said source, conduit means connecting said reservoir with said feed line between said valve and said coil, conduit means connecting said reservoir to receive flash gas from said flash tank for forcing the stored refrigerant into said feed line and through said coil, and valves interposed in said conduit means for controlling such transfer of stored liquid.

11. The combination with a cooling coil connected across the pressure and suction sides of a refrigerant circulating system, of means in the pressure side of the system for admitting liquid refrigerant to the coil in excess of the amount which the coil is capable of evaporating, a closed tank connected at the top to the suction side of the system and at the bottom to the pressure side of the system, valves in the connections normally closing off the tank from the pressure side of the system and establishing communication with the suction side of the system to enable the tank to receive and temporarily store excess liquid refrigerant passing through the coil, said valves being operable to close off the tank from the suction side of the system and establish communication between the tank and the pressure side of the system, and a connection including a valve operable substantially simultaneously with said first-mentioned valves for introducing vaporized refrigerant from the pressure side of the system into said tank to force the stored liquid therefrom and through the coil.

JOHN E. WATKINS.

REFERENCES CITED

The following references are of record in the file of this patent:

UNITED STATES PATENTS

| Number | Name | Date |
| --- | --- | --- |
| 1,106,244 | Schliemann | Aug. 4, 1914 |
| 2,032,286 | Kitzmiller | Feb. 25, 1936 |
| 2,144,898 | Shrode | Jan. 24, 1939 |